March 14, 1961   J. R. KRUSE, JR., ET AL   2,975,293
OPTICAL DEFECT DETECTOR
Filed Feb. 18, 1955   3 Sheets-Sheet 1

INVENTORS
John R. Kruse, Jr.
Laurance D. Burgess
John H. Stumpf
BY
Harness, Dickey & Pierce
ATTORNEYS March 14, 1961 J. R. KRUSE, JR., ET AL 2,975,293
OPTICAL DEFECT DETECTOR Filed Feb. 18, 1955 3 Sheets-Sheet 3

INVENTORS
John R. Kruse, Jr.
Lawrence Burgess.
John A. Stumpf.
BY Barnes, Dickey & Pierce.
ATTORNEYS.

United States Patent Office 2,975,293
Patented Mar. 14, 1961

2,975,293

OPTICAL DEFECT DETECTOR

John R. Kruse, Jr., Laurance D. Burgess, and John A. Stumpf, Lancaster, Ohio, assignors to Diamond Power Specialty Corporation, Lancaster, Ohio, a corporation of Ohio Filed Feb. 18, 1955, Ser. No. 489,184

16 Claims. (Cl. 250—219)

This invention relates to flaw-detecting systems and more particularly to photo-electric or electro-optical flaw-sensing mechanisms.

The object of this invention is to improve the accuracy and to reduce the cost of inspection of materials.

A feature of this invention is an apparatus for selectively detecting a change in any of a variety of characteristics, such as configuration, reflectivity, temperature, or color, of a material moving with respect to the apparatus.

Another feature of this invention is an improved means for continuously examining a moving surface to detect any selected one or more of a variety of types of defects in a moving medium and to instigate the operation of auxiliary equipment upon such detection.

A further feature of the invention is an apparatus capable of detecting flaws, exceeding any predetermined size, in a moving medium.

In general, in accordance with the principles of the invention, television system components are employed to inspect a moving surface for selected defects capable of photo-electric detection. However, contrary to the conventional practice, the electronic scanning is unidimensional. A second scanning dimension is provided by mechanically transporting the scanned object so that any element thereon intersects the line of electronic scanning. The rate of electronic scanning is high relative to the rate of mechanical scanning.

The electronic scanning is preferably spatially rectilinear and temporally sinusoidal, as accomplished by deflecting an electron-beam in but one dimension by means of a sinusoidal control signal. In the disclosed embodiment of the invention, mechanical scanning is performed by moving the object to be inspected, preferably a thread, ribbon, bar, rod or sheet of material produced or handled on a continuous-flow basis, perpendicularly to the electronic-scanning dimension at a constant speed. However, it is not necessary that the mechanical scan be so related to the electronic scan and to time, but may be a complex function of space and time in certain applications. For example, the mechanical motion might be rotational, and the time-function, oscillatory.

The utilization of a sine-wave sweep of the electron-beam unmodified by blanking or synchronizing pulses permits accurate discrimination between signals arising from and indicative of a discontinuity in the sensed characteristic of the moving medium and signals arising as an incident of the electronic scanning operation.

The output signal does or may include a normally abrupt wave form or pulse containing high-frequency components, relatively low-frequency components resulting from electronic or optical shading, a sinusoidal component arising from coupling of the sinusoidal sweep signal to the output, and, possibly, harmonics resulting from the use of an impure sweep voltage or current. Therefore, since there are no high-frequency control-signal components (e.g. blanking or synchronizing signals) to produce spurious defect-simulating indications, the discrimination can be accomplished by frequency-sensitive means.

Thus, any signal components of the sweep frequency may be blocked, or shunted to ground, by an appropriate, simple filter resonant at the sweep frequency. The incorporation of such a filter also serves to prevent the sinusoidal scanning signals from coupling into the sensitive video amplifier and producing video signal-level inequalities so that intentional or accidental limiters will clip portions of the information which it is desired to transmit to terminal or rejection equipment. It would not be possible to remove undesirable, coupled scanning signals of complex wave form without recourse to complex filters and without removing by these filters important portions of the information.

Further, electrical differentiating circuits may be provided having a time constant functionally related to the period of the electronic scan. The sensing of a flaw results in the production of a postive and/or negative pulse, usually abrupt in form. With either type of defect signal, the derivative wave comprises relatively high amplitude spikes of both polarities, either polarity of spike being removable by limiting, if desired, producing a unidirectional pulse or train of pulses. On the other hand, the derivative of a sine function of time has the same form (the cosine form) as the function, and thus gives rise to no double-polarity high-amplitude spikes which could be mistaken for defects.

It is apparent that the use of an electronic scanning wave rectilinear, discontinuous or complex in wave form would result in the production of differential wave forms not readily detectable from the defect or flaw derivative pulses. Thus, by the use of differentiation in conjunction with a sinsoidal electronic scan, and the absence of blanking or synchronizing pulses, signals resulting from defects or flaws may be accurately and distinctly detected, and signals otherwise arising may be precisely discriminated against.

The manner of accomplishment of the foregoing object and the precise nature of the foregoing features, and other objects and features of the invention, may be understood from a consideration of the following detailed description of one embodiment of the invention when read with reference to the accompanying drawings in which:

Fig. 2 is placed to the right of Fig. 1 and in extension thereof;

Figure 1:
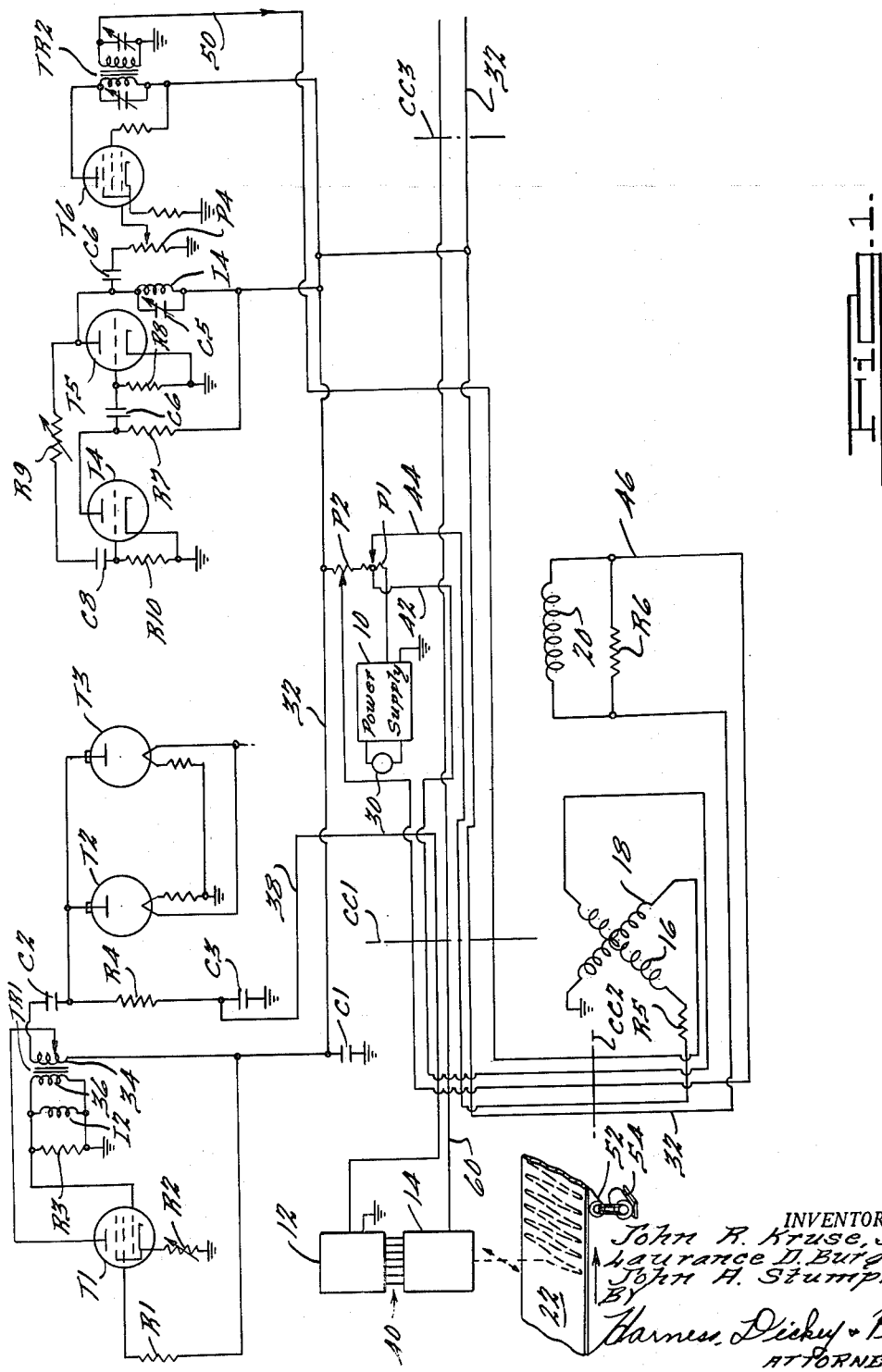
Figure 1 is a schematic representation of a sensing device and control circuits therefor.
Figure 3:
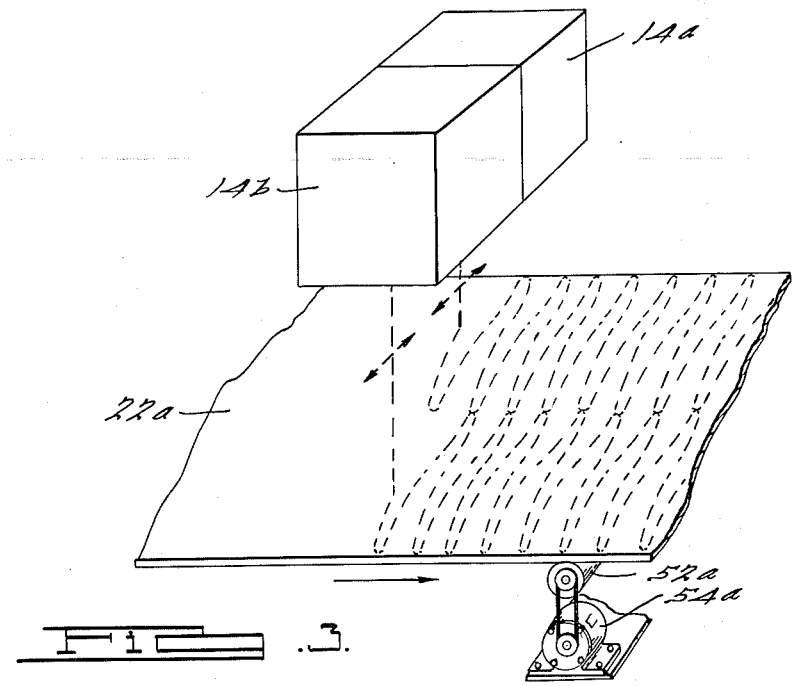
Figure 4:
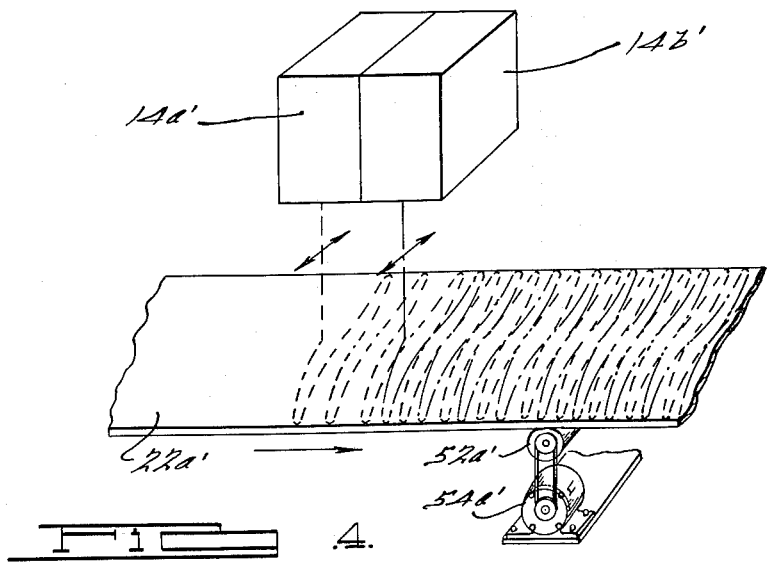

Figure 3 is a diagrammatic representation of an arrangement similar to that of a portion of Fig. 1 except that a pair of televison cameras are placed side by side, each scanning one-half of the width of the medium; and Figure 4 is a diagrammatic representation of an arrangement similar to that of Fig. 3 except that the two cameras are positioned to scan the medium in series, with their traces being interlaced.

Figure 2:
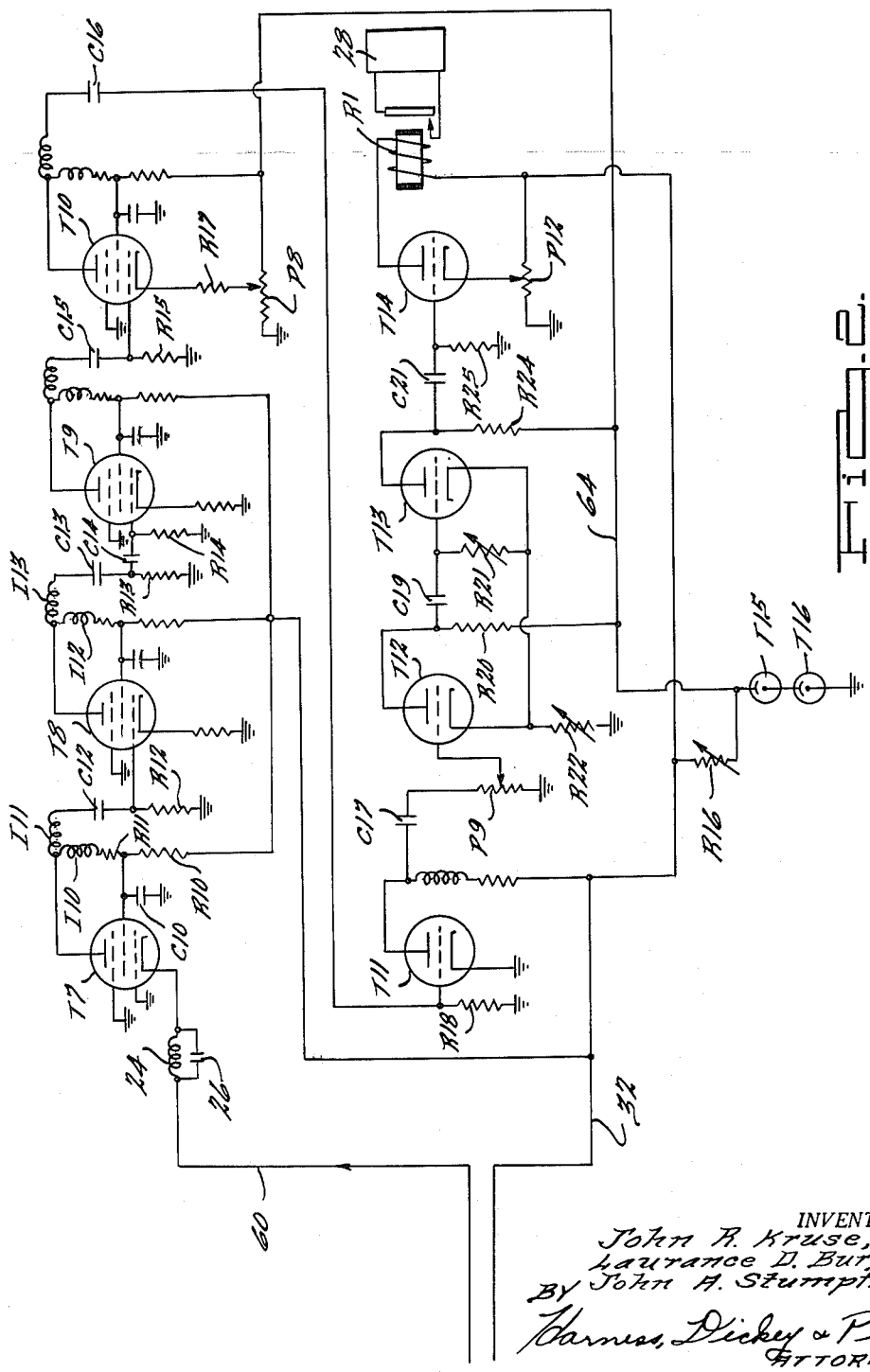
Figure 2 is a schematic representation of certain amplifying, differentiating, limiting and terminal-equipment controlling equipment responsive to the circuits of Fig. 1, the two sheets of drawings being properly oriented if

Referring first generally to those drawings, oriented in the fashion described, a power supply 10 is shown on Fig. 1 of the drawings which supplies the electrical circuits of both Figs. 1 and 2 with direct voltage. Higher voltage, developed by a circuit including tubes T1, T2 and T3, is applied through control circuit 12 to a camera tube 14 which is represented in block schematic form except for the detailed showing of its vertical positioning coil 16, horizontal scan coil 18 and focus coil 20. Direct voltage is applied to the vertical positioning coil 16 and to the focus coil 20 from the power supply 10, while a sinusoidal current wave form is applied to the horizontal scanning coil 18 by means including tubes T4, T5 and T6.

The output signal of camera tube 14, obtained as the result of the scanning of the moving material 22, is applied to a resonant filter comprising inductor 24 and capacitor 26 (Fig. 2), amplified and differentiated by means including tubes T7, T8 and T9 and the interstage coupling networks therebetween, limited by means including tube T10, and amplified by tube T11. The resulting signal is employed to trigger a cathode coupled multivibrator including tubes T12 and T13 which drives a power stage including tube T14 to operate a relay R1 which controls terminal equipment 28.

The power supply 10 may comprise any suitable conventional rectifying and filtering means for deriving from an alternating current source 30 a direct voltage adequate for the needs of the system. The output voltage from power supply 10 is applied through the resistive portions of potentiometers P1 and P2 to conductor 32 which extends throughout the two sheet of drawings.

The positive potential on conductor 32 is grounded through a filtering or decoupling capacitor C1 and is applied through resistor R1 to the screen grid of tube T1 and through winding 34 and the tap thereon of transformer TR1 to the anode of tube T1. Tube T1 is preferably a beam-power type of power amplifier connected, however, in an oscillatory circuit including a variable cathode resistor R2, grid-leak bias resistor R3, and a load coil or inductor I2, the winding 36 of the transformer TR1 serving as a tickler coil. The resultant high frequency oscillations are coupled through capacitor C2 to the anodes of a pair of high voltage rectifiers T2 and T3, the cathodes of which are supplied with a suitable filament voltage in a manner not shown. The rectified negative high voltage output is filtered by means including resistor R4 and capacitor C3 and applied via conductor 38 to the camera control circuit 12.

The camera control circuit 12 comprises, essentially, a voltage-divider network capable of converting the high voltage (which in the disclosed embodiment of the invention is exemplarily disclosed as being negative in polarity relative to ground) appearing on conductor 38 into a plurality of different direct voltages of appropriate values to be applied by means of conductors 40 to the several electrodes of the camera tube 14 in a manner well known in the art.

Potentiometer P1 is provided with a central tap connected to conductor 42 and a movable wiper connected to conductor 44 to apply a variable current through resistor R5 and the vertical positioning coil 16 for the camera tube 14. While the amplitude and direction of this current may be controlled by adjusting the position of the moving wiper of potentiometer P1 relative to the fixed tap thereon, to adjust the vertical position of the electron beam in camera tube 14 in a vertical sense (left and right on the drawings), it will be noted that no alternating current is applied to the vertical positioning coil 16 so that there is no beam sweep in a vertical sense except that provided by nonelectrical means in a manner hereinafter to be described.

The positive direct voltage appearing on conductor 32 is applied to the camera tube focus coil 20, shunted by resistor R6, the other terminal of coil 20 and resistor R6 being connected by conductor 46 to the wiper of potentiometer P2. The direction of the current through focus coil 20 is thereby pre-established but the amplitude thereof may be adjusted by shifting the position of the wiper on potentiometer P2 to focus the electron beam in the camera tube 14 in a manner well known in the art.

The positive direct voltage appearing on conductor 32 is also applied through a load resistor R7 to the anode of tube T4 and through the parallel network comprising capacitor C5 and inductor I4 to the anode of tube T5. Tubes T4 and T5 are appropriately intercoupled to operate as a type of relaxation oscillator or free-running multivibrator. Thus, the output of tube T4, as developed across load resistor R7, is coupled to the input of tube T5 by means including capacitor C6 and grid resistor R8, and tube T5 is, in turn, coupled back to tube T4 by means including resistor R9, capacitor C8 and resistor R10, resistor R9 (or any of a number of other elements of the multivibrator circuit) being variable to permit adjustment of the natural frequency of oscillation of the circuit. That frequency, and the frequency to which the parallel resonant circuit comprising inductor I1 and capacitor C5 is tuned, is preferably in the audio-frequency range, being, for example, in the order of one to five kilocycles per second.

The output signal of the free-running multivibrator comprising tubes T4 and T5, as developed across the parallel resonant circuit comprising inductor I4 and capacitor C5, is applied through a coupling network including capacitor C6 and scan-width adjusting potentiometer P4 to the control grid of tube T6, which is preferably a beam-power amplifier. The amplified output signal from tube T6 is applied through transformer TR2, both the primary and the secondary of which are tuned to the desired output frequency, and via conductor 50 to the horizontal scan coil 18, the other end of which is grounded.

The current through the horizontal scanning coil 18 is preferably sinusoidal in form and may be derived from any conventional sine-wave generator or oscillator. However, it is well known, the current requirements are or may be relatively high, imposing relatively severe power-developing capability requirements on conventional sine-wave oscillators, normally necessitating the provision of a plurality of stages of amplification. A free-running multivibrator of the type shown is capable of developing the requisite alternating-current power levels with a minimum of subsequent amplification, and while such a multivibrator produces an output signal non-sinusoidal in form, the fundamental of the oscillatory frequency (or any selected harmonic) can be emphasized by the provision of a load circuit tuned to that frequency, such as inductor I4 and capacitor C5, thereby attenuating other harmonics, and by the provision of an output transformer such as TR2 also tuned to the selected frequency. The disclosed circuit has been found to be capable of producing a current in the horizontal scan coil 18 which is adequately sinusoidal in form to meet the imposed conditions hereinafter to be described.

It will be noted that electrostatic focusing and deflection may be employed.

By virtue of the above-described arrangement, suitable direct voltages are applied to the camera tube 14, the scanning beam is adjustably set in one direction, e.g. the "vertical" direction, and the camera beam is caused to sweep bi-directionally in another dimension, e.g. the "horizontal" dimension, at a sinusoidal rate with respect to time. Thus, when viewing a fixed object, the camera will scan back and forth along a single straight line, the amplitude of the scan relative to the center of the line at any time after the scanning departs from that center having a displacement which is proportional to the sine of the product of the angular-scanning frequency and elapsed time.

Scanning in the other direction, e.g. in the "vertical" dimension, is accomplished by moving the scanned object relative to the camera.

That the physical components embodying the disclosed circuitry may be distinct and separated in space is denoted by the representation of connectors CC1, CC2 and CC3.

The disclosed system is particularly adapted to scan the surface of a moving thread, ribbon, bar, rod or sheet of material tending to have defects of any type capable of being sensed by the television camera tube. For example, paper produced in a continuous-flow process frequently possesses discolored areas necessitating rejection and excision of the affected portion. Similarly, in the manufacture of glass, superficial discontinuities or variations in the translucency or transparency sometimes occur, and in the manufacture of steel unequal heating or cooling of a portion of the length of the processed material may indicate discrepancies from the standard material requiring further investigation. Each of these types of defects, and others, may be detected by the disclosed system.

Further, the moving medium may be normally of one color and possess defects of another color, or may possess defects of two different colors only one of which is unacceptable. The disclosed equipment may be rendered capable of discriminating between vari-colored defects by means of the interposition of suitable optical filtering means between the camera and the material being scanned thereby to adjust the spectral-response characteristics of the mosaic layer in the camera tube.

In Fig. 1 of the drawings there is shown a sheet of moving material 22, which may be considered to be paper for example, driven by a roller 52 energized by a motor 54. The dotted lines on the material 22 describe the progress of the electron beam in the camera if that beam were extended, as it in fact is not. While the direction of motion of the material 22 has been shown to be perpendicular to the direction of the electronic scan, it should be recognized that the system will operate with any other angle, other than zero, of relative motion between the electronic scanning beam and the moving object. It will also be recognized that the motion of the scanned medium 22 need not be rectilinear.

Since there is no retrace blanking, two lines will be scanned for each cycle of the scanning period. The camera is preferably situated sufficiently far from the moving medium 22 that its angle of vision will encompass the width of the moving medium. The speed of motion of medium 22 is then adjusted, by controlling the speed of motor 54, so that the maximum distance between adjacent scanning lines is not greater than the smallest defect size which is to be detected. Conversely, with a fixed or optimum speed of motion of the moving medium 22, as determined by manufacturing considerations, the horizontal scanning frequency may be adjusted by appropriately shifting the parameters of the circuit including tubes T4 and T5.

In some cases it may be found that a single camera cannot adequately perform the requisite functions, particularly when the material width is great, the material speed is high, or when it is necessary to detect the presence of minute defects on the moving medium, or a combination of these factors. In such an application, it may be necessary to employ a plurality of cameras 14 adequately to perform the function. Thus, a pair of cameras may be placed side by side, each scanning one half of the width of the medium 22, or a pair of cameras may be positioned to scan the medium 22 in series, as by having their traces interlaced. Additional cameras may be employed in an obvious manner, the width of the material, the rate of material flow, the minimum defects size and the horizontal resolution of the system and bandpass of the system being the factors determinative of the number of cameras required.

The output signal of the camera 14 is applied via conductor 60 (extending to Fig. 2 of the drawings) and through a parallel resonant circuit comprising inductor 24 and capacitor 26 to the cathode of grounded-grid amplifier T7. The resonant circuit comprising inductor 24 and capacitor 26 presents a high impedance to signals of the scanning frequency thereby serving to prevent signals of that frequency from being coupled into the video amplifier. The simplicity of this network is permitted by the fact that a sinusodial scan is employed.

The control and suppressor grids of pentode T7 are grounded, the screen grid is grounded through a bypass capacitor C10 and is connected to the positive potential on conductor 32 through resistor R10, and the anode of tube T7 is connected to the positive potential on conductor 32 through resistor R10, load resistor R11 and shunt peaking coil I10. The amplified output signal is applied to the control grid of amplifier T8 by means including a series peaking coil I11, coupling capacitor C12, and grid resistor R12.

Pentode T8 comprises a conventional stage of video amplification, and is provided with a shunt peaking coil I12 and a series peaking coil I13. However, the amplified signal from tube T8 is or may be coupled to tube T9 through a pair of differentiating networks. Thus, the output signal is applied through capacitor C13 and resistor R13 to ground and the output voltage therefrom is taken across resistor R13. As was before noted, any signals arising from electronic or optical shading and any scanning signals coupled to the video amplifier are low in frequency relative to the defect signals, which are usually abrupt in form and contain high-frequency components. Capacitor C13 presents a high impedance to low-frequency signals and consequently but a small portion of incoming low-frequency signals appears across resistor R13. The parameters are so selected that the signals are differentiated. Thus, whether the sensed defect appears, to the television camera, to be brighter or darker than the standard color of the moving material, a pulse will be produced of one or the other of two polarities, one or both of the leading and trailing edges of which are relatively abrupt and steep. Therefore, regardless of the polarity of the signal, upon differentiation, a pair of spikes of opposite polarity will be produced.

The output signal voltage appearing across resistor R13 is applied through a second differentiating circuit comprising capacitor C14 and resistor R14. The degree of differentiating is preferably progressive. Thus, the time constant of the network comprising capacitor C13 and resistor R13 is preferably greater than the time constant of the network comprising capacitor C14 and resistor R14, the time constant, RC, of the first network being as large as 40 microseconds and the time constant of the network comprising capacitor C14 and resistor R14 being in the order of 10 microseconds, as examples.

The differentiated signal, as further amplified by tube T9, is applied to a third differentiating network comprising capacitor C15 and resistor R15, the time constant of this network preferably being still smaller, e.g., less than one microsecond.

The input signal to tube T10, appearing across resistor R15, comprises, therefore, one or more pairs of opposite-polarity spikes. Either spike of each pair of flaw signals may be removed to obtain sigle polarity flaw signals by the employment of a limiter or clipper T10. In the disclosed embodiment of the invention, the negative-polarity spikes are deleted, the peaks of the positive-polarity spikes are passed.

It will be noted that limiter T10 is connected identically to the video amplifiers T8 and T9 except that means are provided to bias the tube substantially negative. Thus, the positive voltage appearing on conductor 32 is applied through variable resistor R16 to a pair of diode voltage regulators T15 and T16 connected in series to ground. As a result, a closely regulated positive direct voltage appears on conductor 64, this regulated voltage serving as the positive supply for the anode and screen grid of tube T10 and as the source of biasing potential for that tube, being applied to ground through the resistive element of potentiometer P8 to apply a direct voltage through resistor R17 to the cathode of tube T10. Potentiometer P8 is adjusted so that no negative polarity input signals, and, preferably, no positive-polarity derivatives of non-flaw signals, are amplified by tube T10. The peaks of the incoming positive polarity spikes, however, are amplified and inverted by tube T10 and applied through a coupling network including capacitor C16 and resistor R18 (the time constant of which may be the same as that of capacitor C15 and resistor R15) to the input of tube T11. Since the only input signals to that tube are negative-going spikes, the cathode of tube T11 may be grounded.

The output of tube T11 is applied to trigger a cathode-coupled multivibrator circuit comprising tubes T12 and T13 which are supplied with a regulated plate voltage. The triggering pulses are applied through capacitor C17 and potentiometer P9 to the control grid of triode T12, the output of which, as developed across load resistor R20, is applied to the input of tube T13 by means including coupling capacitor C19 and variable grid resistor R21. The inter-tube cross coupling is completed by means of a feedback connection including the common cathode resistor R22, which is preferably variable. Since the lower end of resistor R21 is connected to the cathode of tube T13 instead of to ground, the voltage drop across resistor R22 is applied as grid bias only to tube T12. As a result, tubes T12 and T13 will not operate as a free-running multivibrator, but will function as a single-cycle or single-shot multivibrator upon being triggered by the application of a pulse to the input thereof.

During rest or non-signal periods, tube T13 is fully conducting and tube T12 is biased below cutoff. Upon the application of a positive pulse to the input of tube T12, a substantially square wave, positive-going output pulse will appear across load resistor R24 and be applied through the coupling network including capacitor C21 (which has a relatively high value of capacitance) and resistor R25 to the input of triode T14. Tube T14 is biased, by means including potentiometer P12, so that insufficient current flows in the plate circuit including relay R1 to operate that relay. However, upon the application to the input of tube T14 of a positive-going pulse signal, representing the fact that a flaw has been sensed, the plate current in tube T14 momentarily increases adequately to operate relay R1 to complete a circuit including the load device or terminal equipment 28.

A locking circuit may be provided for relay R1 if desired or, preferably, means may be provided in the terminal equipment 28 for insuring that that equipment will complete its deleting or rejecting operation even though relay R1 may be released as a result of the termination of the input signal to tube T14.

Terminal equipment 28 may comprise any conventional device for performing the requisite function, e.g., it may comprise a cutting mechanism for excising the affected portion of the material being scanned, its position relative to the camera tube T14 being selected as a function of the rate of flow of the material, of the sensing time of the disclosed system, and of its own response time. If necessary, time delay means may be incorporated in the disclosed circuits to insure that the portion of the scanned material containing the defect will be under the excising mechanism at the time that mechanism is energized.

In the arrangement of Fig. 3, two television cameras 14a and 14b are placed side by side, each scanning one-half of the width of the medium 22a, that medium being driven by a roller 52a energized by a motor 54a.

In the arrangement illustrated in Fig. 4, the two cameras 14a' and 14b' are positioned to scan the medium 22a' in series, with their traces being interlaced as illustrated. The medium 22a' is driven by a roller 52a' energized by a motor 54a'.

While it will be apparent that the embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In a system for indicating variations in a selected characteristic of a medium, means for producing an image of the medium, means for scanning said image to produce an output signal including an informational component, means for driving said scanning means at a sinusoidal rate, said output signal tending to include a sinusoidal component at the scanning frequency, output means, and means for discriminating against said sinusoidal component and for actuating said output means only in response to said informational component comprising means for differentiating the output signal, limiting means for amplifying only the high-amplitude portion of said differentiated signal, and means responsive to the output of said limiting means for actuating said output means.

2. In combination, a television camera tube for producing an output signal including an informational component, means for producing an image on an element of said tube, means including deflecting means in said tube for scanning said image, means for applying a sinusoidal signal to said deflecting means, said output signal tending to include a sinusoidal component at the scanning frequency, output means, and means for discriminating against said sinusoidal component and for actuating said output means only in response to said informational component comprising means for differentiating said output signal, limiting means for amplifying only the high-amplitude portion of said differentiated signal, and means responsive to the output of said limiting means for actuating said output means.

3. In combination, a television camera tube, means for producing an image on an element of said tube, means including deflecting means in said tube for scanning said image, means for applying a sinusoidal signal to said deflecting means, means including said tube for producing an output signal having a non-informational sinusoidal component sporadically modulated by an informational component of an abrupt wave form, said output signal tending to include a sinusoidal component at the scanning frequency, output means, and means for discriminating against said sinusoidal component and for actuating said output means only in response to said informational component comprising means for deriving a pulse from said informational component having an amplitude high relative to the amplitude of said sinusoidal component, and means responsive to said pulse for actuating said output means.

4. In combination, a television camera tube, means for producing an image on an element of said tube, means including deflecting means in said tube for scanning said image, means for applying a sinusoidal signal to said deflecting means, means including said tube for producing an output signal having a non-informational sinusoidal component, sporadically modulated by an informational component of an abrupt wave form, said output signal tending to include a sinusoidal component at the scanning frequency, output means, and means for discriminating against said sinusoidal component and for actuating said output means only in response to said informational component comprising means for differentiating said signal, output means, means for amplifying said differentiated signal, limiting means for amplifying only the high-amplitude portion of said amplified signal, and means responsive to the output of said limiting means for actuating said output means.

5. In combination, a television camera tube, means for producing an image on an element of said tube, means including deflecting means in said tube for scanning said image, means for applying a sinusoidal signal to said deflecting means, means including said tube for producing an output signal having a non-informational sinusoidal component sporadically modulated by an informational component of an abrupt wave form, said output signal tending to include a sinusoidal component at the scanning frequency, output means, and means for discriminating against said sinusoidal component and for actuating said output means only in response to said informational component comprising means for differentiating said signal for producing a derivative pulse from said informational component of said signal having a peak amplitude high relative to the amplitude of the derivative of the sinusoidal component of said signal, limiting means responsive only to the high-amplitude peak of said derivative pulse for producing an output signal, and means responsive to the output signal from said limiting means for actuating said output means.

6. In combination, a television camera tube, means for producing an image on an element of said tube, means including deflecting means in said tube for scanning said image, means for applying a sinusoidal signal to said deflecting means, means including said tube for producing an output signal having a non-informational sinusoidal component, sporadically modulated by an informational component of an abrupt wave form and modulated by a third component, said third component being low in frequency relative to said informational component, means for deriving a pulse from said informational component having an amplitude high relative to the amplitude of said sinusoidal component and of said third component, output means, and means responsive to said pulse for controlling said output means.

7. In combination, a television camera tube, means for producing an image or an element of said tube, means including deflecting means in said tube for scanning said image means for applying a sinusoidal signal to said deflecting means, means including said tube for producing an output signal having a non-informational sinusoidal component sporadically modulated by an informational component of an abrupt wave form and modulated by a third component, said third component being low in frequency relative to said informational component, means for differentiating said signal for producing a derivative pulse from the informational component of said signal having a peak amplitude high relative to the amplitude of the derivative of the sinusoidal component of said signal and to the amplitude of the derivative of the third component of said signal, limiting means responsive only to the high-amplitude peak of said derivative pulse for producing an output signal, output means, and means responsive to the output signal from said limiting means for controlling said output means.

8. In combination, a television camera tube, means for producing an image on an element of said tube, means including deflecting means in said tube for scanning said image, means for applying a sinusoidal signal to said deflecting means, means including said tube for producing an output signal having a non-informational sinusoidal component sporadically modulated by an informational component of an abrupt wave form and modulated by a third component, said third component being low in frequency relative to said informational component, impedance means for selectively attenuating the sinusoidal component of said signal, means for differentiating said signal for producing a derivative pulse from the informational component of said signal having a peak amplitude high relative to the amplitude of the derivative of the sinusoidal component of said signal and to the amplitude of the derivative of the third component of said signal, limiting means responsive to only the high-amplitude peak of said derivative pulse for producing an output signal, output means, and means responsive to the output signal from said limiting means for controlling said output means.

9. In combination, a medium to be scanned for variations of a selected characteristic, said medium having a finite width, means for scanning across the width of said medium comprising a plurality of television cameras each scanning a portion of the width and each having an electron beam and means for deflecting each of said beams to scan lines shorter in length than said width, each said line lying entirely on said medium, and means for scanning the length of said medium comprising means for moving said medium relative to said cameras.

10. In combination, a medium to be scanned having a finite width, means for scanning across the width of said medium comprising a plurality of television cameras each scanning the entire width and each having an electron beam and means for deflecting each of said beams along a line lying entirely on said medium, means for scanning the length of said medium comprising means for moving said medium relative to said camera, and means for adjusting the distance between the scanning lines of said plurality of cameras relative to the rate of motion of said medium for causing the lines of scan of said plurality of cameras to interlace.

11. In combination, means for producing a non-informational sinusoidal signal, means for sporadically, intermittently and irregularly generating an informational signal of abrupt wave form, means for combining said non-informational sinusoidal signal and said informational signal for producing a signal having said non-informational sinusoidal signal and said abrupt wave wave form informational signal as components, output means, and means for discriminating against said sinusoidal component and for actuating said output means only in response to said sporadic abrupt wave form informational component comprising means for differentiating said signal for producing a a differentiated signal having a co-sinusoidal component derived from said sinusoidal component and high-amplitude spikes derived from said abrupt wave form informational component, and means responsive only to the high-amplitude portion of said differentiated signal for actuating said output means.

12. The combination of claim 11 further including means for amplifying said differentiated signal, and means for passing only the high-amplitude peaks of said amplified signals, and in which said output means is actuated in response to said high-amplitude peaks.

13. The combination of claim 11 further including impedance means for attenuating said sinusoidal component and in which the amplitude of said spikes is high relative both to the amplitude of said attenuated sinusoidal component and to the co-sinusoidal component derived therefrom.

14. The combination of claim 11 in which said high-amplitude spikes alternate in polarity and further including means for amplifying only the high-amplitude peaks of the high-amplitude spikes of one polarity.

15. The combination of claim 11 in which said means for producing a non-informational sinusoidal signal includes a sinusoidal generator coupled to the deflection means in a television camera tube having an output circuit, in which said means for sporadically, intermittently and irregularly generating an informational signal of abrupt wave-form includes electrodes of said camera tube and a beam deflected by said deflection means to scan an image on the face of said camera tube, and in which said means for combining said non-informational sinusoidal signal and said informational signal for producing a signal having said non-informational sinusoidal signal and said informational signal as components includes said camera tube and elements coupling the sinusoidal deflection signal applied to said deflecting means to the output circuit of said camera tube.

16. In a system for scanning the width of a travelling sheet of material and for producing a distinct and abrupt output signal for actuating an output device only in response to the appearance of a visible defect upon the sheet of traveling material, the combination of a television camera including output circuit means for producing an output signal which has a relatively abrupt waveform in response to the appearance of a visible defect upon the sheet of traveling material and deflectable scanning beam means and means for preventing the improper transmission of an output signal from actuating the output device in response to signals from said scanning beam means improperly coupling into said output circuit means comprising means for deflecting said scanning beam means solely, at a sinusoidal rate for causing all signals improperly coupled into said output circuit from said scanning beam means to be sinusoidal, and means for differentiating said output signal.

References Cited in the file of this patent

UNITED STATES PATENTS

| | | |
|---|---|---|
| 1,483,172 | Gannett | Feb. 12, 1924 |
| 1,996,878 | Ohl | Apr. 9, 1935 |
| 2,247,684 | Hickok | July 1, 1941 |
| 2,315,621 | Ives | Apr. 6, 1943 |
| 2,408,078 | Labin et al. | Sept. 24, 1946 |
| 2,416,306 | Grieg | Feb. 25, 1947 |
| 2,531,974 | Ellett | Nov. 28, 1950 |
| 2,548,590 | Cook | Apr. 10, 1951 |
| 2,663,857 | Holcomb | Dec. 22, 1953 |
| 2,674,915 | Anderson | Apr. 13, 1954 |
| 2,703,150 | Rieber | Mar. 1, 1955 |
| 2,764,698 | Knight | Sept. 25, 1956 |
| 2,803,755 | Milford | Aug. 20, 1957 |
| 2,809,298 | Cawein | Oct. 8, 1957 |

UNITED STATES PATENT OFFICE
CERTIFICATE OF CORRECTION

March 14, 1961

Patent No. 2,975,293

John R. Kruse, Jr., et al.

It is hereby certified that error appears in the above numbered patent requiring correction and that the said Letters Patent should read as corrected below.

Column 2, line 34, for "sinsoidal" read -- sinusoidal --; column 4, line 11, for "Il" read -- I4 --; column 6, line 51, for "sigle" read -- single --; column 9, line 26, for "or" read -- on --; column 10, line 21, strike out "wave"; line 27, strike out "a", first occurrence; same column 10, line 37, for "signals" read -- signal --.

Signed and sealed this 10th day of October 1961.

(SEAL)
Attest:

ERNEST W. SWIDER
Attesting Officer

DAVID L. LADD
Commissioner of Patents

USCOMM-DC